(12) United States Patent
Lagergren

(10) Patent No.: US 7,353,504 B2
(45) Date of Patent: Apr. 1, 2008

(54) SYSTEM AND METHOD FOR EFFICIENTLY GENERATING NATIVE CODE CALLS FROM BYTE CODE IN VIRTUAL MACHINES

(75) Inventor: Marcus Lagergren, Stockholm (SE)

(73) Assignee: BEA Systems, Inc., San Jose, CA (US)

( * ) Notice: Subject to any disclaimer, the term of this patent is extended or adjusted under 35 U.S.C. 154(b) by 57 days.

(21) Appl. No.: 11/397,212

(22) Filed: Apr. 4, 2006

(65) Prior Publication Data

US 2007/0136719 A1 Jun. 14, 2007

Related U.S. Application Data

(60) Provisional application No. 60/748,763, filed on Dec. 9, 2005.

(51) Int. Cl.
*G06F 9/45* (2006.01)
(52) U.S. Cl. .................. 717/151; 717/136; 717/137; 717/139; 717/140
(58) Field of Classification Search ........ 717/144–148, 717/151–152, 136–140, 118, 134–135
See application file for complete search history.

(56) References Cited

U.S. PATENT DOCUMENTS 7,086,041 B2 * 8/2006 Plesko et al. .............. 717/141
7,152,229 B2 * 12/2006 Chong et al. .............. 717/146
2004/0168162 A1 * 8/2004 Park et al. .................. 717/148
2004/0268309 A1 * 12/2004 Grover et al. .............. 717/120

FOREIGN PATENT DOCUMENTS

WO 2007/070073 A2 6/2007

\* cited by examiner

*Primary Examiner*—William Wood
(74) *Attorney, Agent, or Firm*—Fliesler Meyer LLP

(57) ABSTRACT

A system and method for generation of efficient calls from compiled byte code within a virtual machine (VM) or Java Virtual Machine (JVM) environment. Current techniques used to interface dynamically compiled byte code with native libraries using stubs are unsatisfactory due to non-optimal performance and the large amount of manual work needed to maintain the stub generation code. An embodiment of the present invention addresses this by providing a system and a method for automatic stub generation based on a small set of parameters stored in a ParamInfo structure. In accordance with an embodiment, the system comprises a computer with native libraries; a virtual machine for executing a software application; a memory space for the compiled byte code; and a compiler with a calling convention adaptor that integrates native calls into the high level analysis step of the compilation of byte codes, so that the overhead for the native call is reduced.

12 Claims, 3 Drawing Sheets

SYSTEM AND METHOD FOR EFFICIENTLY GENERATING NATIVE CODE CALLS FROM BYTE CODE IN VIRTUAL MACHINES

CLAIM OF PRIORITY

This application claims the benefit of U.S. Provisional Patent Application No. 60/748,763; entitled "SYSTEM AND METHOD FOR EFFICIENTLY GENERATING NATIVE CODE CALLS FROM BYTE CODE IN VIRTUAL MACHINES"; filed Dec. 9, 2005, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to virtual machine environments and other run-time environments, and particularly to a system and method for improving generation of native code calls from byte code.

BACKGROUND

Virtual machines are abstract computers that allow for portability of software applications, typically between different underlying computer architectures. A virtual machine (VM) is generally a complex software product that is implemented upon a particular computer hardware platform and/or operating system. The VM then provides a uniform layer of abstraction between the hardware platform and any compiled software applications that will run thereon. Virtual machines are essential for the portability of certain technologies, including Java. The Java Virtual Machine (JVM) allows compiled Java programs to be run on the JVM, independently of whatever hardware or operating system may be underneath. The JVM is described in further detail in the book "The Java™ Virtual Machine Specification (2nd Edition)" by Tim Lindholm, published by Sun Microsystems, and incorporated herein by reference. Examples of commercially available JVMs include the Sun Java Virtual Machine from Sun Microsystems, Inc., and the JRockit Virtual Machine from BEA Systems, Inc.

A real CPU understands and executes instructions native to that CPU (commonly called native code) in comparison a virtual machine understands and executes virtual machine instructions (commonly called byte code). A virtual machine almost always run on a real CPU executing native code. The core of a virtual machine is normally implemented in a programming language such as C, that is always compiled to native code using an OS/CPU compatible compiler.

A virtual machine can implement different strategies of how to execute the byte codes. If the virtual machine analyzes each byte code separately and does this every time the same byte code is executed, then the the virtual machine is said to be an "interpreter". If the virtual machine translates the byte code into native code once and then the native code is used every time the same byte code is executed, then the virtual machine is said to be a "just in time compiler" (commonly called a JIT).

Some virtual machines contain both an interpreter and a JIT. In the case of Java Virtual Machines, the Sun Java Virtual Machine will initially use the interpreter when executing Java byte code. When the Sun JVM detects byte code that is executed often (commonly called a hot spot in the program), then it will compile that part of the byte code into native code. By contrast, the JRockit Virtual Machine from BEA will never interpret the Java byte code. It will always compile it to native code before executing it. If JRockit detects a hot spot in the program it will recompile that part of the byte code again, but with more code optimizations.

A Java Virtual Machine always needs to call native code to access operating system resources. Since the core of the Java Virtual Machine is written in a language such as C that can be compiled and linked to the operating system libraries, accessing operating system resources is simply a native function call following the platform calling conventions.

A JIT tries to optimize function calls between Java functions to use the most efficient way of calling on the particular CPU. One way to do this is to use registers as much as possible for arguments to functions. Due to several reasons this is usually not the same as the platform calling convention. For example, a JIT for a language with garbage collecting (like Java) needs to take care which registers contain pointers to live objects, the Java-to-Java calling convention can therefore declare that certain registers always contain object pointers and not temporary results from arithmetic calculations. Such care is not needed for the native calling convention. On a register-starved architecture like the Intel x86 processors, the JIT can also use fewer callee save registers than the platform calling convention and instead use the remaining registers for function arguments.

However, often byte code needs to make use of native libraries. These libraries can be used for a variety of purposes, including: low level graphics (like the implementation of the Standard Widget Library (SWT) from the Eclipse project); database access (native drivers are sometimes required to speed up access to databases); or large amounts of legacy code that cannot be ported.

In the Java language this is solved using the standardized Java Native Interface (JNI). The JNI specifies that the native code should be called using the platform calling convention, and also specifies how the Java arguments are translated to a format that native code can use. JNI is described in further detail in the book "Java™ Native Interface: Programmers Guide and Specification" by Sheng Liang, which is incorporated herein by reference.

Traditionally, a call from compiled Java code to native code is redirected through a short piece of native code (a stub), and the stubs are generated by a stub generator. The stub performs the translation of the arguments, sets up the call to conform to the platform calling convention and finally calls the native code. Depending on the JIT strategy, some arguments, such as numbers need not be translated. In those cases the overhead introduced by the extra function calls are more noticeable than when several necessary argument translations are part of the call. If the native function that is called is very short, then the overhead of the native call setup can be significant.

TABLE 1

| Platform/Environment | A Java call | A native call |
|---|---|---|
| x86_64/Windows | Ptr args: rsi, rdi<br>Inte args: rax, rdx<br>Stack used for more args.<br>Calle save: rbx, rbp | Args: rcx, rdx, r8, r9<br>Stack used for more args. |
| x86_64/Linux | Same as above | Args: rdi, rsi, rcx, rdx, r8, r9<br>Stack used for more args. |
| x86/Windows & Linux | Ptr args: esi, edi<br>Inte args: eax, edx<br>Stack used for more args.<br>Calle save: ebx, ebp | Stack used for all args. |
| ia64/Windows & Linux | Same as right. | Variable sized stack frame on register stack.<br>Args: r32, r33, . . . |

It is also a significant amount of work to write the stub generators given the number of common operating systems, for example AIX, Linux, Solaris and Windows NT/2k/XP, and their respective calling conventions. Table 1 shows that Windows NT/2k/XP and Linux use the same calling convention on Intel x86 and ia64 processors. However Windows and Linux use different calling conventions on Intel EM64T compatible processors (x86_64). Other calling conventions include AIX on IBM PowerPC processors, and Solaris on SPARC processors.

Listing 1

```
public class HelloWorld
{
    native void printHelloWorld(int a);
    static { System.loadLibrary("nativelib"); }
    public static void main(String[ ] args) {
        HelloWorld h = new HelloWorld( );
        h.helloWorld(0x1111);
        h.helloWorld(0x2222);
        h.helloWorld(0x3333);
        h.helloWorld(0x4444);
        h.helloWorld(0x5555);
        h.helloWorld(0x6666);
    }
}
```

Listing 1 demonstrates an example of a Java-program that calls a native library. A class-file, such as that shown in Listing 2, is generated when the program is compiled with javac.

Listing 2

```
 0:   new            #2; //class HelloWorld
 3:   dup
 4:   invokespecial  #3; //Method "<init>":( )V
 7:   astore_1
 8:   aload_1
 9:   sipush 4369
12:   invokevirtual#4; //Method printHelloWorld:(I)V
15:   aload_1
16:   sipush 8738
19:   invokevirtual#4; //Method printHelloWorld:(I)V
22:   aload_1
23:   sipush 13107
26:   invokevirtual#4; //Method printHelloWorld:(I)V
29:   aload_1
30:   sipush 17476
33:   invokevirtual#4; //Method printHelloWorld:(I)V
```

Listing 2 -continued

```
36:   aload_1
37:   sipush 21845
40:   invokevirtual#4; //Method printHelloWorld:(I)V
43:   aload_1
44:   sipush 26214
47:   invokevirtual#4; //Method printHelloWorld:(I)V
50:   return
```

Some virtual machines, including versions of the JRockit Virtual Machine from BEA will compile this bytecode using standard compilation techniques. Some of these techniques are described in the books "Advanced Compiler Design and Implementation" by Steven S. Muchnik; "Crafting a Compiler with C" by Charles N. Fischer and Richard J. LeBlanc, Jr.; and "Compilers" by Alfred V. Aho, Ravi Sethi, Jeffrey D. Ullman, all of which are incorporated herein by reference. The process is typically to translate the bytecode first into a high level intermediate representation (HIR); then to a medium level intermediate representation (MIR); and then to a low level intermediate level representation (LIR).

Listing 3

```
0x100080bc0:    push     %rbx
0x100080bc1:    mov      $0x140c2c0,%rax
0x100080bcb:    callq    0x100005410
0x100080bd0:    mov      %rsi,%rbx
0x100080bd3:    callq    0x100080720
0x100080bd8:    mov      $0x1111,%eax
0x100080bdd:    mov      %rbx,%rsi
0x100080be0:    mov      (%rbx),%ecx
0x100080be3:    nop
0x100080be4:    callq    0x10008075e
0x100080be9:    mov      $0x2222,%eax
0x100080bee:    mov      %rbx,%rsi
0x100080bf1:    mov      (%rbx),%ecx
0x100080bf4:    nop
0x100080bf5:    callq    0x10008075e
0x100080bfa:    mov      $0x3333,%eax
0x100080bff:    mov      %rbx,%rsi
0x100080c02:    mov      (%rbx),%ecx
0x100080c05:    nop
0x100080c06:    callq    0x10008075e
0x100080c0b:    mov      $0x4444,%eax
0x100080c10:    mov      %rbx,%rsi
0x100080c13:    mov      (%rbx),%ecx
0x100080c16:    nop
0x100080c17:    callq    0x10008075e
0x100080c1c:    mov      $0x5555,%eax
0x100080c21:    mov      %rbx,%rsi
0x100080c24:    mov      (%rbx),%ecx
0x100080c27:    nop
0x100080c28:    callq    0x10008075e
0x100080c2d:    mov      %rbx,%rsi
0x100080c30:    mov      $0x6666,%eax
0x100080c35:    mov      (%rbx),%ecx
0x100080c38:    nop
0x100080c39:    callq    0x10008075e
0x100080c3e:    pop      %rbx
0x100080c3f:    retq
```

Listing 3 shows the native machine code generated by versions of JRockit from the example code for the x86_64/Linux platform. The address 0x10008075e is the address of the stub that will call the native c-function. The assembler code in Listing 3 follows the specification in Table 1 for the x86_64/Linux platform: the calling convention for normal Java to Java calls puts the object pointer inside rsi, and the first integer into eax. If a second pointer had been used, it would have been put into rdi, and a second integer would be put into edx. Also according to the Java calling convention, rbx is a callee save register which is why it is restored from the stack before the return.

Listing 4

```
JNIEXPORT void JNICALL
Java_HelloWorld_printHelloWorld (JNIEnv *env, jobject obj, jint x)
{
    printf ("Hello World %d\n", x);
}
```

Listing 4 shows an example of a function that follows the JNI-specification (previously referenced above) and which can therefore be called using the above native call.

A Traditional Native Call Stub

To interface the calls in the compiled Java code in Listing 3 to the c-function in Listing 4 on the x86_64/Linux platform, the stub needs to put a pointer to the JNIEnv in edi, leave the object pointer in esi, and move the integer argument from eax to ecx, before calling Java_HelloWorld_printHelloWorld. The traditional stub generator is tailored for each CPU/OS platform and generates the lowest level of IR (LIR) that is essentially a one-to-one mapping to machine code.

Listing 5

Variables, constants and labels:

```
v1 (reg, rsi)        v2 (reg, rax)       v3 (reg, rsp)
c4 (i64, 0x30)       v5 [rsp+0x28]       v6 (reg, rbx)
v7 [rsp+0x20]        v8 (reg, rbp)       v9 [rsp]
v10 (reg, r10)       c11 (i64, 0x6ab140) v12 [rsp+0xfffffffffffff000]
v13 [rbp+0x8]                            v14 [rbp+0x1f0]
v15 [rsp+0x8]                            v16 (reg, r12)
c17 (i64, 0xf)                           v18 [rbx]
c19 (i64, 0x8)                           v20 [rbp+0x1e8]
v21 (reg, rdi)                           v22 (reg, rdx)
L23 (0x2aaaae1746d8) <--Address of Java_HelloWorld_printHelloWorld
v24 [rbp+0x10]                           L25 (0x100000580)
c26 (i64, 0x0)                           c27 (i64, 0xf4)
Parameters:

rsi (this) rax
block0:
    0    x86_sub       rsp 0x30 ->rsp (i64)
    1    x86_mov       rbx ->[rsp+0x28] (i64)
    2    x86_mov       rbp ->[rsp+0x20] (i64)
    3    x86_mov       0x6ab140 ->r10 (i64)
    4    x86_mov       r10 ->[rsp] (i64)
    5    x86_mov       rax ->[rsp+0xfffffffffffff000] (i64)
    6    lir_thread_vm ->rbp (i64)
    7    x86_mov       rsp ->[rbp+0x8] (i64)
    8    x86_mov       [rbp+0x1f0] ->rbx (i64)
    9    x86_mov       rbx ->[rsp+0x8] (i64)
    10   x86_mov       rsp ->r12 (i64)
    11   x86_mov       r12 ->r10 (i64)
    12   x86_and       r10 0xf ->r10 (i64)
    13   x86_sub       rsp r10 ->rsp (i64)
    14   x86_push      rax
    15   x86_test      rsi rsi (i64)
== (then block3, else block4)
block1:
    34   x86_cmp       [rbp+0x8] 0x0 (i64)
== (then block7, else block8)
```

Listing 5 -continued

```
block2:
    33   x86_call      L25
goto (block1)
block3:
    16   x86_push      rsi
goto (block5)
block4:
    17   x86_mov       rsi ->[rbx] (i64)
    18   x86_push      rbx
    19   x86_add       rbx 0x8 ->rbx (i64)
block5:
    20   x86_lea       [rbp+0x1e8] ->r10 (i64)
    21   x86_push      r10
    22   x86_pop       ->rdi (i64)
    23   x86_pop       ->rsi (i64)
    24   x86_pop       ->rdx (i64)
    25   x86_mov       rbx ->[rbp+0x1f0] (i64)
    26   lir_clrreg    ->rbp (i64)
    27   x86_call      L23
    28   lir_thread_vm ->rbp (i64)
    29   x86_mov       r12 ->rsp (i64)
    30   x86_mov       [rbp+0x10] ->r10 (i64)
    31   x86_mov       r10 ->[rbp+0x8] (i64)
    32   x86_test      r10 r10 (i64)
!= (then block2, else block1)
block6:
    37   x86_mov       [rsp+0x8] ->r10 (i64)
    38   x86_mov       r10 ->[rbp+0x1f0] (i64)
    39   x86_mov       [rsp+0x28] ->rbx (i64)
    40   x86_mov       [rsp+0x20] ->rbp (i64)
    41   x86_add       rsp 0x30 ->rsp (i64)
    42   x86_ret
block7:
    35   x86_cmp       [rbp+0x10] 0x0 (i64)
== (then block6, else block8)
block8:
    36   lir_code      0xf4
goto (block6)
```

Listing 5 shows the low-level intermediate representation of the generated As can be seen, the traditional stub generator has to produce the correct native instructions for the current CPU/OS platform. Only the branch commands are automatically added by the translation from LIR to native machine code.

Pseudo Code For A Traditional Native Call Stub Generator

The following pseudo code describes a traditional stub generator that is tailored for the x86_64/Linux platform. It makes use of the following types:

pd_addr is a C-storage type for platform dependent addresses. 64 bit long on the EM64T/AMD64 platform.
NativeFrame is a structure which is placed on the stack as part of the native call. It contains:
    oldHandles: is a pointer to the old JNI handles
    preserved[PLATFORM_NOOF_PRESERVED_STORAGES]:
    space for all registers that need to be preserved over the native call.
    retAddr: Pointer to the return address in the compiled java code.
    debugInfo: is a pointer to the debugInfo,
    The native frame also contains copies of the parameter registers and the return
    value register.

Variables:

```
jci: is the JNI call info structure used for bookkeeping during
   stub generation.
preserved: is a list of all preserved storages for the java calling
   convention.
np: is the length of the preserved list.
ir: is the tree of the intermediate representation of the stub.
current_block: contains code to setup call.
transitblock: is code necessary for the last transit to native code.
end_block: is code to handle the return from native code.
```

Subroutines:

```
SetupParametersForCall: Transforms the java parameters to native
   parameters.
GetFrom: Acquire source var for LIR operation.
PushReference: Generate code that pushes a reference storage on the
   stack.
PushNativeParameter: Generate code that pushes a primitive type
   on the stack.
```

Step (1) The stub generator first sets up the book keeping data structures:

```
Setup return type of native function call.
jci->ret_type
Setup how many storages are needed for the return type, int=1 or long=2.
jci->ret_type_storages
Setup ret_frame to reference storage location(s) for the java return type.
jci->ret_frame[ ]
Setup ret_calle to reference storage location(s) for the native return type.
jci->ret_callee[ ]
Later align is setup to contain reference to the IR op that performs stack
   alignment.
jci->align
jci->types= CG_MALLOC(env, (2*mpiGetNoofArgs(jci->
   mpi)+2)*sizeof(JlcType));
jci->pushed = 0;
jci->handles = 0;
jci->storage = CG_MALLOC(env, (2*mpiGetNoofArgs(jci->
   mpi)+2)*sizeof(Storage));
jci->jniEnv = env->jniEnv;
```

Step (2) Initialize three code blocks:

```
block = CreateIRBlock(ir);
end_block = CreateIRBlock(ir);
```

-continued

```
transit_block = CreateIRBlock(ir);
block_done = CreateIRBlock(ir);
```

Step (3) Allocate native frame. The initial part of the stack frame for native function calls is always the same size:

```
AppendIRToBlock(block, IR_X86_SUB(ir,
   IR_X86_SP,
   IR_CONSTANT(NATIVEFRAME_SIZE*sizeof(pd_addr)),
   IR_X86_SP))
```

Step (4) Store each preserved register on the stack so they can be restored after the JNI call:

```
for (i=0; i<np; ++i)
{
   AppendIRToBlock(block, IR_X86_MOV(ir,
      irGetStorageVar(ir, preserved[i]),
      IR_RELATIVE_ID(X86_SP,
         sizeof(void*)*(np-i-1)+offsetof(
            struct NativeFrame, preserved))))
}
```

Step (5) To make stack walking easier store a pointer to the native function in the stack frame:

```
AppendIRToBlock(block, IR_X86_MOV(ir,
   IR_CONSTANT(irGetDebufInfo(ir)),
   JAVA_TRANSIT_SCRATCH_REG))
AppendIRToBlock(block, IR_X86_MOV(ir,
   JAVA_TRANSIT_SCRATCH_REG,
   IR_RELATIVE_ID(X86_SP, offsetof(
      struct NativeFrame, debugInfo))))
```

Step (6) Add a unconditional write (stackbang) that verifies that it is at least one page of stack left for the native function:

```
AppendIRToBlock(block, IR_X86_MOV_T(ir, IR_PD_ADDR,
   IR_X86_A,
   IR_RELATIVE_ID(X86_SP, -(int) (size_t)sysPageSize)));
```

Step (7) Load the thread local data pointer and store the current stack pointer (the last Java stack frame) in the thread local data:

```
AppendIRToBlock(block, IR_LIR_THREAD_VM(ir, JAVA_TRANSIT_THREAD_REG));
AppendIRToBlock(block, IR_X86_MOV_T(ir, IR_PD_ADDR,
   IR_X86_SP,
   JAVA_TRANSIT_THREAD_REG_ID(VMT_LAST_JAVA_FRAME_OFFSET)));
```

Step (8) Save the current JNI handles to the thread local data:

```
AppendIRToBlock(block, IR_X86_MOV_T(ir, IR_PD_ADDR,
   JAVA_TRANSIT_THREAD_REG_ID
   (VMT_HANDLES_OFFSET),
   JAVA2C_HANDLE_REG));
```

```
AppendIRToBlock(block, IR_X86_MOV_T(ir, IR_PD_ADDR,
    JAVA2C_HANDLE_REG,
    IR_RELATIVE_ID(X86_SP, offsetof(
                    struct NativeFrame, oldHandles))))
```

Step (9) Store the value of rsp before the parameters and alignment are pushed:

```
AppendIRToBlock(block, IR_X86_MOV_T(ir, IR_PD_ADDR,
    IR_X86_SP,
    JAVA2C_SCRATCH_PRESERVED_REG));
AppendIRToBlock(block, IR_X86_MOV_T(ir, IR_PD_ADDR,
    JAVA2C_SCRATCH_PRESERVED_REG,
    JAVA_TRANSIT_SCRATCH_REG));
```

Step (10) Align stack since the native calling convention X86_64 Linux requires 16 byte aligned stack pointers when entering a native function:

```
AppendIRToBlock(block, IR_X86_AND(ir,
    JAVA_TRANSIT_SCRATCH_REG,
    IR_CONSTANT(STACK_ALIGNMENT-1),
    JAVA_TRANSIT_SCRATCH_REG))
AppendIRToBlock(block, jci->align = IR_X86_SUB(ir,
    IR_X86_SP,
    JAVA_TRANSIT_SCRATCH_REG,
    IR_X86_SP))
```

Step (11) Place parameters in the correct places, basically push all on stack, and then pop some/all into the correct regs:
SetupParametersForCall (block);

Step (12) Store JNI handle in thread local data if the native function takes such arguments that need handles (usually pointers to objects):

```
if (jci.handles != 0)
{
    AppendIRToBlock(block, IR_X86_MOV_T(ir, IR_PD_ADDR,
        JAVA2C_HANDLE_REG,
        JAVA_TRANSIT_THREAD_REG_ID
        (VMT_HANDLES_OFFSET)))
}
```

Step (13) Patch the alignment of the stack if needed:

```
if (jci.pushed & 1) {
    InsertIROpAfter(IR_X86_SUB(ir,
        IR_X86_SP,
        IR_CONSTANT(sizeof(pd_addr)),
        IR_X86_SP),
    jci->align;
}
```

Step (14) The stack is setup, so the call can be made to the native function:
AppendIRToBlock(block, IR_X86_CALL(ir, IR_LABEL (ir, code)));

Step (15) Restore the stack pointer, and at the same time skip the stack alignment:

```
AppendIRToBlock(block, IR_X86_MOV_T(ir, IR_PD_ADDR,
    JAVA2C_SCRATCH_PRESERVED_REG,
    IR_X86_SP));
```

Step (16) The thread local variable oldframe is a copy of the last Java frame if the native code has thrown exceptions. Otherwise oldframe will be NULL:

```
AppendIRToBlock(block, IR_X86_MOV_T(ir, IR_PD_ADDR,
    JAVA_TRANSIT_THREAD_REG_ID(VMT_CHECKATTRANSITFRAME_OFFSET),
    JAVA_TRANSIT_SCRATCH_REG));
```

Step (17) Restore the last Java frame:

```
AppendIRToBlock(block, IR_X86_MOV_T(ir, IR_PD_ADDR,
    JAVA_TRANSIT_SCRATCH_REG,
    JAVA_TRANSIT_THREAD_REG_ID(VMT_LAST_JAVA_FRAME_OFFSET)));
```

Step (18) Test if oldframe was zero or not. If oldframe is non-zero, an exception has happened and TransitToJava must be executed, otherwise proceed to the end_block:

```
AppendIRToBlock(block, IR_X86_TEST(ir,
    JAVA_TRANSIT_SCRATCH_REG,
    JAVA_TRANSIT_SCRATCH_REG));
AppendIRToBlock(block, IRBB_JCC, IR_NE);
ConnectIRBlock(ir, block, transit_block);
ConnectIRBlock(ir, block, end_block);
```

Step (19) Create the transit block that executes the TransitToJava function that takes care of thrown JNI exceptions. First store the native return value in the frame so it will survive TransitToJava:

```
for (i=0; i<jci->ret_type_storages; i++)
{
    from = irGetStorageVar(ir, data.ret_callee[i]);
    to   = IR_RELATIVE_ID(X86_SP, offsetof(struct NativeFrame, space[i]));
    switch (CG_GET_STORAGE_TYPE(data.ret_callee[i]))
    {
        case STORAGE_TYPE_NORMAL:
            AppendIRToBlock(transit_block, IR_X86_MOV_T(ir, IR_PD_ADDR, from, to));
            break;
        case STORAGE_TYPE_FLOAT:
            AppendIRToBlock(transit_block, IR_X86_FSTP_T(ir, jci.ret_type ==
JLC_FLOAT ? IR_F32 : IR_F64,
                                           from, to));
            break;
        case STORAGE_TYPE_XMM:
            AppendIRToBlock(transit_block, jci.ret_type == JLC_FLOAT ?
                                      IR_X86_MOVSS(ir, from, to) :
                                      IR_X86_MOVSD(ir, from, to));
            break;
    }
}
AppendIRToBlock(block, IR_X86_CALL(ir, IR_LABEL(ir,
CI_GET_CODE(cgGetCodeMethodCI(transitToJava_V)))));
for (i=0 ; i<data.ret_type_storages ; i++)
{
    from = IR_RELATIVE_ID(X86_SP, offsetof(struct NativeFrame, space[i]));
    to   = irGetStorageVar(ir, data.ret_callee[i]);
    switch (CG_GET_STORAGE_TYPE(data.ret_callee[i]))
    {
        case STORAGE_TYPE_NORMAL:
            AppendIRToBlock(block, IR_X86_MOV_T(ir, IR_PD_ADDR, from, to));
            break;
        case STORAGE_TYPE_FLOAT:
            AppendIRToBlock(block, IR_X86_FLD_T(ir, data.ret_type ==
JLC_FLOAT ? IR_F32 : IR_F64, from, to));
            break;
        case STORAGE_TYPE_XMM:
            AppendIRToBlock(block,
                      data.ret_type == JLC_FLOAT ? IR_X86_MOVSS(ir, from, to) :
IR_X86_MOVSD(ir, from, to));
            break;
    }
}
ConnectIRBlock(ir, transit_block, end_block);
```

Step (20) To translate the return value from the native code to Java code, assume that the variable is in the correct native return position and move it to the correct Java return position with proper sign extension or zero extension. IF the jci->ret_type==JLC_VOID this step can be skipped:

```
from = irGetStorageVar(ir, jci->ret_callee[0]);
to = irGetStorageVar(ir, jci->ret_frame[0]);
switch (jci->ret_type)
{
    case JLC_BOOLEAN:
    case JLC_BYTE:
        AppendIRToBlock(end_block, IR_X86_MOVSX_T(ir, IR_I8, from, to));
        break;
    case JLC_SHORT:
        AppendIRToBlock(end_block, IR_X86_MOVSX_T(ir, IR_I16, from, to));
        break;
    case JLC_CHAR:
        AppendIRToBlock(end_block, IR_X86_MOVZX_T(ir, IR_UI16, from,
```

-continued

```
to));
            break;
    case JLC_OBJECT:
    case JLC_INTERFACE:
    case JLC_ARRAY:
        AppendIRToBlock(block, IR_X86_MOV_T(ir, IR_REF, from, to));
        append_nullcheck(ir, to, end_block, &block_null, &block_non_null);
        AppendIRToBlock(block_non_null, IR_X86_MOV_T(ir, IR_REF,
                                IR_MEM(ir, to, 0, IR_NONE, 0),
                                to));
        ConnectIRBlock(ir, block_non_null, block_null);
        *end_block = block_null;
        break;
    case JLC_FLOAT:
    case JLC_DOUBLE:
        if (jci->ret_callee[0] == jci->ret_frame[0])
        {
            // Do nothing since native frame and java frame share
            // the same return convention.
        }
        else
        {
            IRType type;
            //this must be x87->xmm or xmm->x87
            tmp = IR_RELATIVE_ID(X86_SP,
                                offsetof(struct NativeFrame, space[0]));
            type = jci->ret_type == JLC_FLOAT ? IR_F32 : IR_F64;
            switch (CG_GET_STORAGE_TYPE(jci->ret_callee[0]))
            {
                case STORAGE_TYPE_FLOAT:
                    AppendIRToBlock(*block,
                                IR_X86_FSTP_T(ir, type, from, tmp));
                    AppendIRToBlock(*block, type == IR_F32 ?
                                IR_X86_MOVSS(ir, tmp, to) :
                                IR_X86_MOVSD(ir, tmp, to));
                    break;
                case STORAGE_TYPE_XMM:
                    AppendIRToBlock(*block, type == IR_F32 ?
                                IR_X86_MOVSS(ir, from, tmp) :
                                IR_X86_MOVSD(ir, from, tmp));
                    AppendIRToBlock(*block, IR_X86_FLD_T(ir, type,
                                tmp, to));
                    break;
            }
        }
        break;
}
```

Step (21) Restore the old handle pointer from the native frame on the stack to the thread local data:

```
AppendIRToBlock(end_block, IR_X86_MOV_T(ir, IR_PD_ADDR,
    IR_RELATIVE_ID(X86_SP,
        offsetof(struct NativeFrame, oldHandles)),
    JAVA_TRANSIT_SCRATCH_REG))
AppendIRToBlock(end_block, IR_X86_MOV_T(ir, IR_PD_ADDR,
    JAVA_TRANSIT_SCRATCH_REG,
    JAVA_TRANSIT_THREAD_REG_ID(VMT_HANDLES_OFFSET)))
```

Step (22) Restore the preserved registers:

```
for (i=0 ; i<np ; i++)
{
    AppendIRToBlock(end_block, IR_X86_MOV_T(ir, IR_PD_ADDR,
        IR_RELATIVE_ID(X86_SP, offsetof(struct NativeFrame, preserved) +
            sizeof(void*)*(np-i-1)),
        irGetStorageVar(ir, preserved[i])));
}
```

Step (23) Deallocate the native frame from the stack:

```
AppendIRToBlock(end_block, IR_X86_ADD(ir,
    IR_X86_SP,
    IR_CONSTANT(NATIVEFRAME_SIZE*sizeof(pd_addr)),
    IR_X86_SP));
```

Step (24) Add the return instruction back to compiled Java code:
AppendIRToBlock(end_block, IR_X86_RET(ir));

The function shown below describes with pseudo code how the parameters are setup to follow the calling convention of the native function. The strategy is to walk through all parameters and push all parameters on the stack that are supposed to be on the stack following the calling convention. Then the parameters that should be in registers are also pushed on the stack but immediately afterwards popped into the correct registers.

```
SetupParametersForCall(IRBlockP *block)
{
    Storage used[PLATFORM_NOOF_STORAGE_TYPES];
    MPIIterS iter;
    int i, n, pos=0, pos0;
    n = mpiGetNoofArgs(jci->mpi);
    memset(used, 0, PLATFORM_NOOF_STORAGE_TYPES*sizeof(int));
    pos0 = 0;
    // Fetch the JNIEnvironment
    jci->storage[pos0] = platformGetNativeParamStorage(STORAGE_TYPE_NORMAL,
                                    pos0, used);
    pos0++;
    for (mpiGetIterator(&iter, jci->mpi, MPIITER_STORAGES, FALSE);
         mpiIteratorHasMore(&iter);
         mpiIteratorNext(&iter))
    {
        jci->storage[pos0] = platformGetNativeParamStorage(
            STORAGETYPE_FOR(iter.jlcType), pos0, used);
        pos0++;
    }
    pos = pos0;
    for (mpiGetIterator(&iter, jci->mpi, MPIITER_STORAGES, TRUE);
         mpiIteratorHasMore(&iter);
         mpiIteratorNext(&iter))
    {
        if (CG_IS_STACK_STORAGE(jci->storage[--pos]))
        {
            PushNativeParameter(block, iter.jlcType, iter.storage);
        }
    }
    pos = pos0;
    for (mpiGetIterator(&iter, jci->mpi, MPIITER_STORAGES, TRUE);
         mpiIteratorHasMore(&iter);
         mpiIteratorNext(&iter))
    {
        if (!CG_IS_STACK_STORAGE(jci->storage[--pos])) {
            PushNativeParameter(block, iter.jlcType, iter.storage);
        }
    }
    // Load the address of the JNIEnvironment
    AppendIRToBlock(*block, IR_X86_LEA_T(ir, IR_PD_ADDR,
                    JAVA_TRANSIT_THREAD_REG_ID(VMT_JNI_INTERFACE_OFFSET),
                    JAVA_TRANSIT_SCRATCH_REG));
    AppendIRToBlock(block, IR_X86_PUSH(ir, get_from(data, ir,
                    irVarGetStorage(ir, JAVA_TRANSIT_SCRATCH_REG))));
    jci->types[jci->pushed++] = JLC_INT;
    memset(used, 0, PLATFORM_NOOF_STORAGE_TYPES*sizeof(int));
    for (i=jci->pushed-1 ; i>=0 ; i--)
    {
        JlcType    jlctype = jci->types[i];
        Storage    storage = platformGetNativeParamStorage(
                                STORAGETYPE_FOR(jlctype), i, used);
        StorageType t = CG_GET_STORAGE_TYPE(storage);
        IRVAR      var = IR_NONE;
        // All stack storages are ensured to be at the end
        if (t == STORAGE_TYPE_STACK) {
            break;
```

```
        } else {
            if (t == STORAGE_TYPE_XMM) {
                if (jlctype == JLC_FLOAT)
                {
                    // Defaults to 32 bit
                    AppendIRToBlock(*block,
                            IR_X86_MOVSS(ir, IR_RELATIVE_ID(X86_SP, 0),
                            irGetOutParamVar(ir, storage)));
                }
                else if (jlctype == JLC_DOUBLE)
                {
                    // Defaults to 64 bit
                    AppendIRToBlock(*block, IR_X86_MOVSD(ir,
                            IR_RELATIVE_ID(X86_SP, 0),
                            irGetOutParamVar(ir, storage)));
                }
                var = JAVA_TRANSIT_SCRATCH_REG;
            }
            else if (t == STORAGE_TYPE_NORMAL)
            {
                var = irGetOutParamVar(ir, storage);
            }
            AppendIRToBlock(*block, IR_X86_POP(ir, var));
            jci->pushed--;
        }
    }
}
IRVAR GetFrom(Storage storage)
{
    if (CG_IS_STACK_STORAGE(storage))
    {
        return IR_RELATIVE_ID(JAVA2C_STACKPARAM_STORAGE,
                        sizeof(pd_addr) * (STACK_EXTRA(data) +
                        CG_GET_STORAGE_INDEX(storage)));
    }
    else
    {
        return irGetStorageVar(ir, storage);
    }
}
PushReference(IRBlockP *block, Storage storage)
{
    IRBlockP block_null, block_not_null, block_done;
    IRVAR from;
    if (CG_IS_STACK_STORAGE(storage)) {
        AppendIRToBlock(*block, IR_X86_MOV_T(ir, IR_REF,
                    GetFrom(data, ir, storage),
                    JAVA_TRANSIT_SCRATCH_REG));
        from = JAVA_TRANSIT_SCRATCH_REG;
    } else {
        from = get_from(data, ir, storage);
    }
    append_nullcheck(ir, from, *block, &block_null, &block_not_null);
    block_done = CreateIRBlock(ir);
    irBBSetMustNotHaveSafepoint(block_done);
    AppendIRToBlock(block_null, IR_X86_PUSH(ir, from));
    irBBConnect(ir, block_null, block_done);
    PushReference(data, ir, &block_not_null, storage, FALSE);
    irBBConnect(ir, block_not_null, block_done);
    *block = block_done;
}
PushNativeParameter(IRBlockP *block, JlcType type, Storage storage)
{
    if (JLCTYPE_IS_PRIMITIVE(type))
    {
        AppendIRToBlock(*block, IR_X86_PUSH(ir, GetFrom(data, ir, storage)));
    }
    else
    {
        PushReference(block, storage);
    }
    jci->types[jci->pushed++] = type;
}
```

Listing 6 shows the final native machine code for the stub. Each machine code instruction maps to one LIR operation in Listing 5, except for the branch instructions, the frame setup and exit that have been added by the compiler.

Listing 6

Entering code with object pointer in esi and integer argument in eax.
```
0x80c70:       sub         $0x30,%rsp
0x80c74:       mov         %rbx,0x28(%rsp)
0x80c79:       mov         %rbp,0x20(%rsp)
0x80c7e:       mov         $0x6ab140,%r10
0x80c88:       mov         %r10,(%rsp)
0x80c8c:       mov         %rax,0xfffffffffffff000(%rsp)
0x80c94:       mov         %fs:0xd8,%rbp
0x80c9d:       mov         %rsp,0x8(%rbp)
0x80ca1:       mov         0x1f0(%rbp),%rbx
0x80ca8:       mov         %rbx,0x8(%rsp)
0x80cad:       mov         %rsp,%r12
0x80cb0:       mov         %r12,%r10
0x80cb3:       and         $0xf,%r10
0x80cb7:       sub         %r10,%rsp
```
Push the integer argument, to be tranferred into rdx.
```
0x80cba:       push        %rax
0x80cbb:       test        %rsi,%rsi
0x80cbe:       jne         0x80cc3
```
Push the object pointer, to be popped into the same register.
```
0x80cc0:       push        %rsi
0x80cc1:       jmp         0x80ccc
0x80cc3:       mov         %rsi,(%rbx)
0x80cc7:       push        %rbx
0x80cc8:       add         $0x8,%rbx
0x80ccc:       lea         0x1e8(%rbp),%r10
```
Push the calculated address to the JNIEnvironment.
```
0x80cd3:       push        %r10
```
Pop the JNIEnvironment into rdi
```
0x80cd5:       pop         %rdi
```
Pop the rsi into rsi.
```
0x80cd6:       pop         %rsi
```
Pop the integer argument into rdx.
```
0x80cd7:       pop         %rdx
0x80cd8:       mov         %rbx,0x1f0(%rbp)
0x80cdf:       xor         %rbp,%rbp
```
Call the native function using ip relative addressing.
```
0x80ce2:       callq       *74(%rip)        # 0x100080d32
0x80ce8:       mov         %fs:0xd8,%rbp
0x80cf1:       mov         %r12,%rsp
0x80cf4:       mov         0x10(%rbp),%r10
0x80cf8:       mov         %r10,0x8(%rbp)
0x80cfc:       test        %r10,%r10
0x80cff:       je          0x80d06
0x80d01:       callq       0x00580
0x80d06:       cmpq        $0x0,0x8(%rbp)
0x80d0b:       jne         0x80d2f
0x80d0d:       cmpq        $0x0,0x10(%rbp)
0x80d12:       jne         0x80d2f
0x80d14:       mov         0x8(%rsp),%r10
0x80d19:       mov         %r10,0x1f0(%rbp)
0x80d20:       mov         0x28(%rsp),%rbx
0x80d25:       mov         0x20(%rsp),%rbp
0x80d2a:       add         $0x30,%rsp
0x80d2e:       retq
0x80d2f:       hlt
0x80d30:       jmp         0x80d14
```

As can be seen from the pseudo code above, the traditional stub generator uses low-level knowledge of the current CPU/OS platform to generate a proper stub for calling native code from compiled byte code. The programmer encodes this knowledge manually. Since the traditional stub generator generates low-level native machine code, no compiler optimization techniques can be applied to the generated stub. Therefore the current techniques used for translating calling conventions in VMs are unsatisfactory due to non-optimal performance for short native functions, and because of the large amount of manual work needed to both add new calling conventions and to maintain the existing set of calling conventions of a large range of CPU/OS combinations.

SUMMARY OF THE INVENTION

Disclosed herein is a system and method for generation of efficient calls from compiled byte code within a virtual machine (VM) to native code within or outside of the VM. In particular the invention can be used in a system that includes a Java Virtual Machine (JVM). As described above, current techniques used to interface dynamically compiled byte code with native libraries using stubs are unsatisfactory due to non-optimal performance and of the large amount of manual work needed to maintain the stub generation code. An embodiment of the present invention addresses this problem by providing a system and a method to generate MIR code for native call stubs that can be compiled into native machine code that uses the current CPU/OS platform calling convention.

In accordance with an embodiment, the invention provides a system for efficient native call generation in a virtual machine environment, comprising: a computer running an operating system with native libraries; a virtual machine for executing a software application; a memory space for the compiled byte code as part of the software application, a compiler with a calling convention adaptor that generates MIR code for a native calls that is later compiled into native machine code. In accordance with another embodiment, the calling convention adaptor can include the native call into the MIR of the caller function. In accordance with another embodiment, the calling convention adaptor can generate MIR code for native calls of several different kinds of calling conventions.

DETAILED DESCRIPTION

Disclosed herein is a system and method for generation of efficient calls from compiled byte code within a virtual machine to native code within or outside of the virtual machine. Traditionally the JIT defines its own calling convention for compiled Java to Java calls. Java to Native calls are handled with platform specific stubs. A large amount of manual work is required to implement the code that generates these stubs since they are different for each OS/CPU combination.

Figure 1:
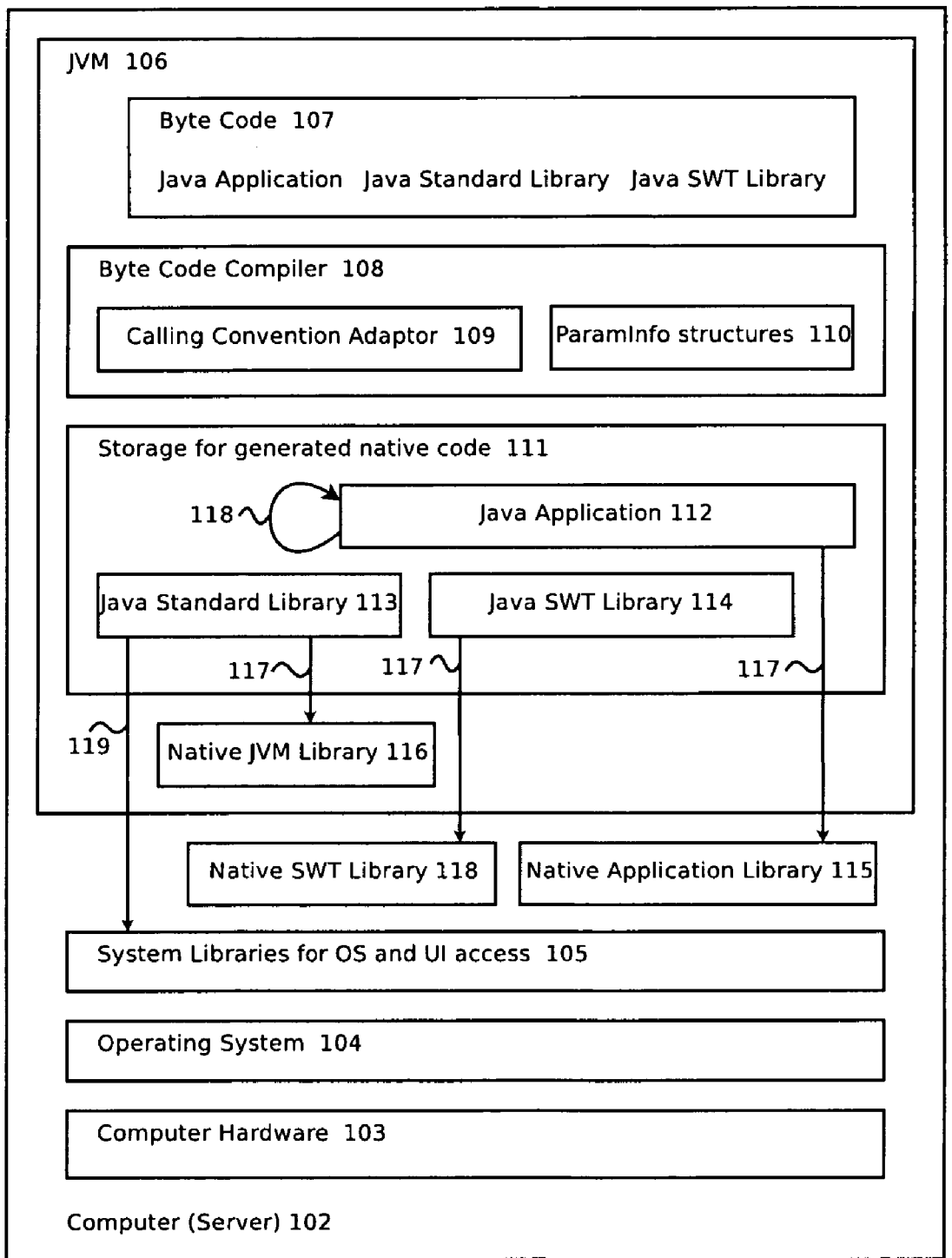
FIG. 1 shows an illustration of a system in accordance with an embodiment of the present invention, that includes a compiler with a calling convention adaptor that generates efficient native code calls from virtual machine byte codes.

FIG. 1 shows an illustration of a system in accordance with an embodiment of the present invention, that includes an byte code compiler with a calling convention adaptor which controls the compilation process. As shown in FIG. 1, the system 101 may include a computer or physical server 102, that includes a hardware 103, operating system 104, libraries for operating system and user interface access 105 and run-time environment or virtual machine 106. The virtual machine may be a Java Virtual Machine (JVM), examples of which include the Sun Microsystems Inc. Java Virtual Machine, and the JRockit product from BEA Systems, Inc. The JVM contains the byte code to be execute 107, together with a byte code compiler 108. The present invention extends the byte code compiler with a calling convention adaptor 109 and ParamInfo structures 110. The JVM also includes, or has access to, a memory space 111, which in a Java environment comprises the native code generated by the compiler 108. The native code version of the Java Application 112, can make use of different libraries, like the Java Standard Library 113, the Java SWT Library 114 and a Native Application Library 115.

The Java Standard Library is supplied by the JVM and the functionality that make use of operating system resources need to call a Native JVM Library 116. A native call 117 follows the JNI calling convention for the platform. The JNI calling convention is used for the call from the Java Standard Library to the Native JVM Library, for the Java SWT Library to the Native SWT Library and for the call from the Java Application to the Native Application Library. These calls (117) are transferred through a native call stub and the present invention improves both this stub and the process of generating it. The present invention can also include the native call into the MIR of the calling function to avoid a separate stub altogether.

A call 118 within the Java Application follows the Java-to-Java calling convention for the platform, which is different from the JNI calling convention. Since the Java Standard Library is supplied by the JVM, it is possible for a JVM implementation to add a separate (hidden) way of calling 119 the operating system resources using the platform calling convention, without going through an intermediate JNI-compatible library.

Listing 7

Variables and constants:

```
v1 (reg, rsp)              v2 (ref, v2)
v3 (i32, v3)               v4 (i64, v4)
v5 (i64, v5)               v6 (i64, v6)
v7 (i64, v7)               v8 (i64, v8)
v9 (i64, v9)               v10 (i64, v10)
v10 (i64, v10)             v11 (reg, [rsp+0x28])
v12 (i64, v12)             v13 (i32, v13)
v14 (i32, v14)             v15 (i64, v15)
v16 (i64, v16)             v17 (i64, v17)
v18 (i64, v18)             v19 (i64, v19)
c1 (i64, 8)                c2 (i64, 32)
c3 (i64, 7208720)          c4 (i64, 560)
c5 (i64, 24)               c6 (i64, 16)
c7 (i64, 552)              c8 (ref, (nil))
c9 (i64, 40)               c10 (i64, 0)
c11 (i64, 15)              c12 (i64, 204)
```
Labels: (L1 is printHelloWorld)

```
L1 (0x2aab2e4296d8, 0)     L2 ((nil), 0)
```
Parameters:

v2 (this) v3
block200:

```
    0      (i64) thread_vm -> v4
goto (block201)
block201:
    1      (N/A) call      {type=method} {method=stackBang( )V}
    2      (i64) add       rsp 8 -> v5
    3      (i64) mov       v5 -> v6
    4      (i64) st        rsp 32 rsp
    5      (i64) mov       7208720 -> v7
    6      (i64) st        rsp 8 v7
    7      (i64) ld        v4 560 -> v8
    8      (i64) st        rsp 24 v8
    9      (i64) lir_movlbl L2 -> v9
   10      (i64) st        rsp 16 v9
   12      (i64) add       v4 552 -> v10
   13      (ref) cmp       v2 (nil)
== (then block205, else block206)
block202:
   28      (N/A) call      v4 {type=method} {method=transitToJava(J)V}
goto (block203)
block203:
   29      (i64) ld        v4 8 -> v17
   30      (i64) ld        v4 16 -> v18
   31      (i64) or        v17 v18 -> v17
   32      (i64) cmp       v17 0
== (then block209, else block210)
```

-continued

Listing 7

```
block204:
    18    (i64) cast        v3 -> v14
    19    (i32) mov         v14 -> v13
    20    (N/A) call        v4 {type=method} {method=transitFromJava_pd(J)V}
    21    (i64) and         rsp 15 -> v15
    22    (i64) cmp         v15 0
== (then block207, else block208)
block205:
    16    (i64) mov         0 -> v12
    17    (ref) st          rsp 40 v12
goto (block204)
block206:
    14    (ref) st          rsp 40 v2
    15    (i64) add         rsp 40 -> v12
goto (block204)
block207:
    24    (i64) st          v4 8 v5
    11    (i32) call        v10 v12 v13 L1 {keepalive=[rsp+0x28]}
{type=method}
{method=printHelloWorld(I)V}
    25    (i64) ld          v4 16 -> v16
    26    (i64) st          v4 8 v16
    27    (i64) cmp         v16 0
!= (then block202, else block203)
block208:
    23    (N/A) lir_code    204
block209:
    34    (N/A) call        v4 {type=method} {method=transitToJava_pd(J)V}
    36    (i64) ld          rsp 24 -> v19
    37    (i64) st          v4 560 v19
goto (block2011)
block210:
    33    (N/A) lir_code    204
block211:
    35    (N/A) return
```

Figure 2:
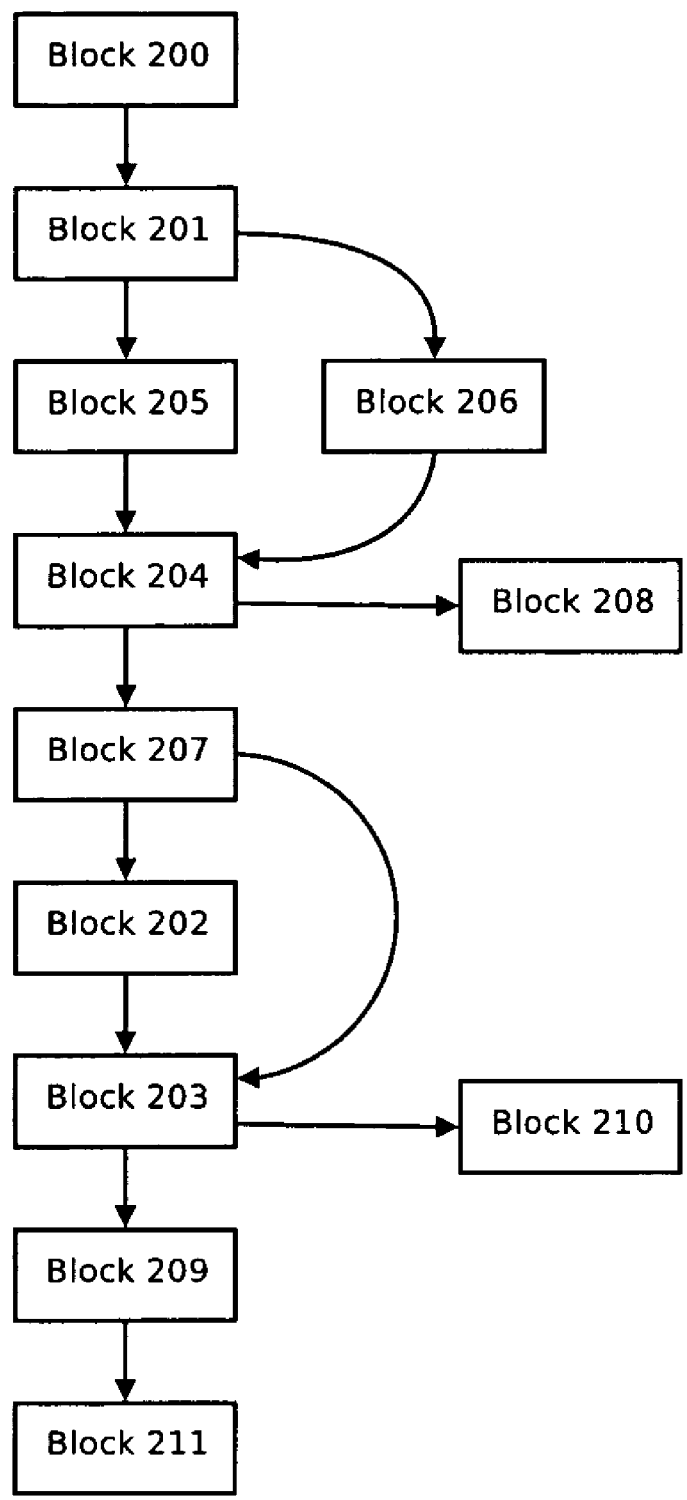
FIG. 2 shows a schematic of the MIR code for a native call, generated by the calling convention adaptor.

FIG. 2 shows a schematic of the MIR code for a native call generated by the calling convention adaptor in accordance with an embodiment of the present invention. The exact contents of each block can be seen in listing 7. In block 200, a pointer (v4) to the thread structure is acquired. In block 201, a stackbang is added to guarantee a minimum amount of stack space for the native call. The stack frame is setup for the native call, allocate JNI-handles in the thread structure, a pointer to a JNIEnv is extracted (v10) and a null pointer check is added. Block 202 transfers the control flow to the Java-exception handler if an exception was thrown from the native code. Block 203 contains useful sanity checks used when debugging. Block 204 translates 32-bit parameter (v3) into a 64-bit native call parameter (v12) and calls a platform dependent leave Java-function which is a no-op on the x86_64/Linux platform. It also checks that the stack is properly aligned. Block 205 moves a null this-pointer into the JNI handle. Block 206 moves a non-null this-pointer into the JNI handle. Block 207 calls the native function using v10, v12 and v13 as arguments. If an exception was thrown from the native code, the control flow will continue to 202, otherwise to 203. Block 208 contains the debug trap that follows a failed stack alignment check (204). Block 209 calls a platform dependent return to Java-function, which is a no-op on the x86_64/Linux platform and frees the JNI-handles allocated in block 201. Block 210 contains the debug trap that follows a failed sanity check (203). Block 211 is the return operation for the stub.

Listing 8

```
Storage gregs[ ] = {X86_64_RDI, X86_64_RSI, X86_64_RDX,
                    X86_64_RCX, X86_64_R8,
                    X86_64_R9};
Storage fregs[ ] = (X86_XMM(0), X86_XMM(1), X86_XMM(2),
                    X86_XMM(3), X86_XMM(4),
                    X86_XMM(5),
                    X86_XMM(6), X86_XMM(7)};
Bool piSetupStoragesNative(ParamInfoP pinfo)
{
    int curgreg;
    int curfreg;
    int offset;
    int sindex;
    int i, n;
    n        = piGetNoofArgs(pinfo);
    offset   = 1;
    sindex   = 0;
    curgreg  = curfreg = 0;
    for (i = 0; i < n; i++) {
        switch(piGetJlcType(pinfo, i)) {
            case JLC_FLOAT:
```

-continued

Listing 8

```
        case JLC_DOUBLE:
            if (curfreg < NOOF_FREGS)
                PI_SET_STORAGE(pinfo,
                    sindex++, fregs[curfreg++]);
            else
                PI_SET_STORAGE(pinfo,
                    sindex++, X86_STACK(offset++));
            break;
        case JLC_LONG:
        case JLC_INT:
        case JLC_SHORT:
        case JLC_BYTE:
        case JLC_CHAR:
        case JLC_BOOLEAN:
        case JLC_OBJECT:
        case JLC_ARRAY:
            if (curgreg < NOOF_GREGS)
                PI_SET_STORAGE(pinfo, sindex++,
                    gregs[curgreg++]);
            else
                PI_SET_STORAGE(pinfo, sindex++,
                    X86_STACK(offset++));
            break;
        default:
            assert(0);
            return FALSE;
        }
    }
    // Ok, now the return type. should not be counted into
    // 'nStorages', even though we store it.
    switch (piGetReturnType(pinfo)) {
        case JLC_VOID:
            break;
        case JLC_LONG:
        case JLC_INT:
        case JLC_SHORT:
        case JLC_BYTE:
        case JLC_CHAR:
        case JLC_BOOLEAN:
        case JLC_OBJECT:
        case JLC_ARRAY:
            PI_SET_STORAGE(pinfo, sindex, X86_64_RAX);
            break;
        case JLC_FLOAT:
        case JLC_DOUBLE:
            // Even if we don't use xmm for our java convention,
            // native always returns floats in xmm0. deal with it
            PI_SET_STORAGE(pinfo, sindex, X86_XMM(0));
            break;
        case JLC_INTERFACE:
            assert(0);
            return FALSE;
    }
    pinfo->nStorages = sindex;
    pinfo->nOnStack = offset;
    return TRUE;
}
```

Figure 3:
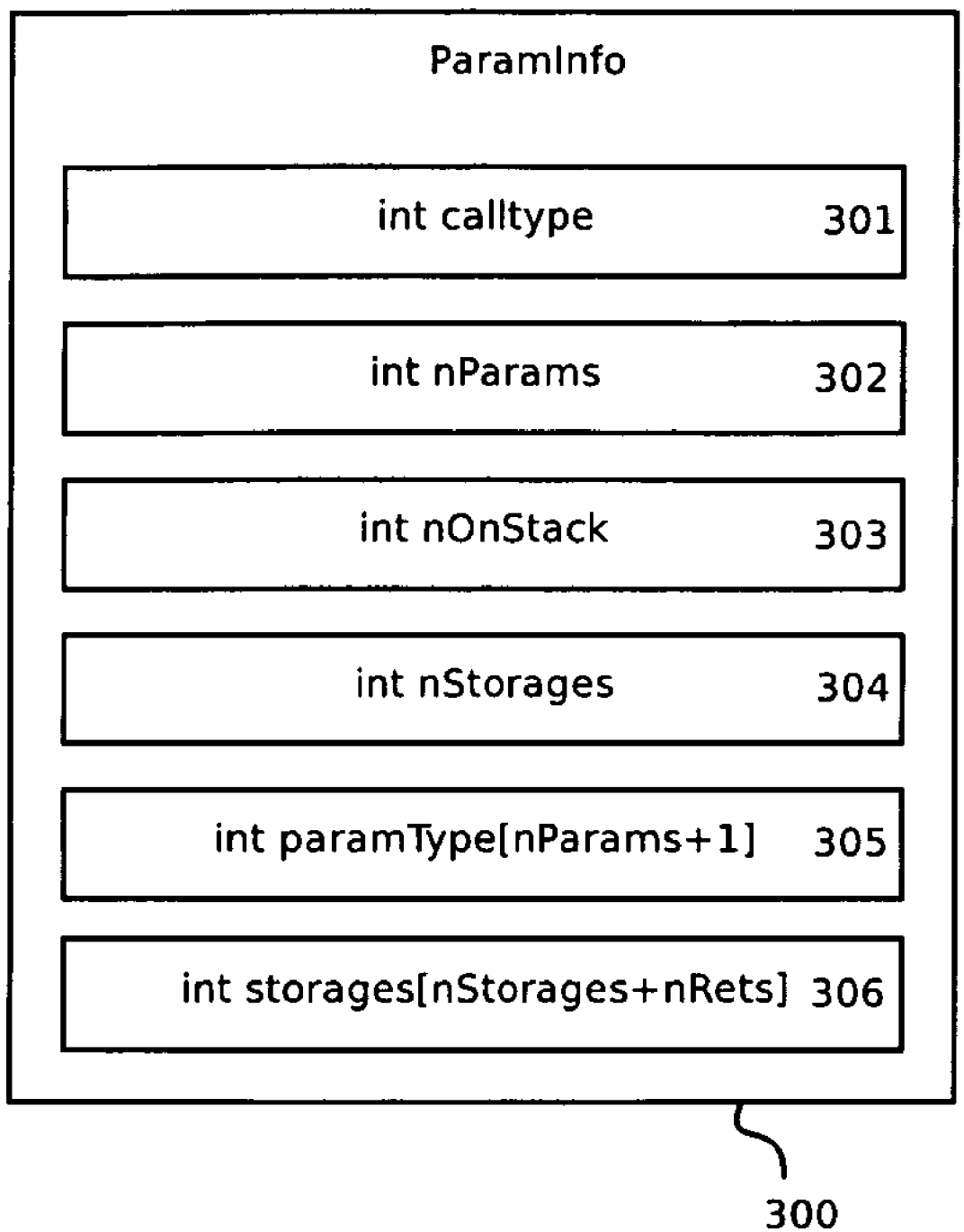
FIG. 3 shows a schematic of the ParamInfo data structure that is used by the compiler to compile the MIR code for a native call into native machine code.

FIG. 3 shows a schematic of the ParamInfo data structure, in accordance with an embodiment of the present invention, which is used by the compiler to compile the MIR code for the native call into native machine code. When the compiler translates a medium level call representation to a low level call representation it will use the ParamInfo structure to add move operations to transfer the MIR call parameters into their proper position for the native call and to move the return value from the call to its proper variable. Listing 8 shows the details of the procedure piSetupStoragesNative which is used to setup the ParamInfo for the native calling convention on the x86_64/Linux platform. The ParamInfo structure 300 contains: the call type 301, which is one of: PARAMTYPE_JAVA, PARAMTYPE_NATIVE, PARAMTYPE_NATIVE_JNI; the number of arguments 302; the exact number of platform words 303 that are pushed on the stack to store the arguments that cannot be stored in registers; the exact number of MIR storages 304 for the arguments (the exact number varies with the OS/CPU combination); the type for each parameter and the return value 305, where each type is one of: JLC_LONG, JLC_DOUBLE, JLC_INT, JLC_FLOAT, JLC_SHORT, JLC_CHAR, JLC_BYTE, JLC_BOOLEAN, JLC_VOID, JLC_OBJECT, JLC_INTERFACE, JLC_ARRAY; the MIR storages 306 for the parameters, where a storage can be a register or a stack position and the MIR storages (nRets) for the return type. nRets is zero if the return type is void. If the call is virtual, the first storage is the "this" pointer, which is then followed by the actual parameters. If the return type is not void, storages and a parameter may well share the same storage.

In accordance with an embodiment, the function piSetupStoragesNative takes as argument a ParamInfo filled with the correct call type (calltype), number of parameters (nParams), the parameter types and the return type (paramType). It then iterates over function parameters and creates proper storages for each parameter according to the calling convention, here encoded in the variables gregs and fregs. It also creates storages for the return type. More than one storage for a parameter or the return type can be required, e.g. for 64-bit primitive data types on 32-bit platforms.

When the compiler translates "call v10 v12 v13" in block 207:11 (illustrated in Listing 7) from MIR to LIR, it will iterate over the parameters (v10, v12, v13) and for each parameter look up the proper storage for the parameter in the ParamInfo structure for the function to be called. If the storage is a normal integer register or stack position, a single LIR move operation is inserted to move the variable to the proper storage. If the storage is a floating point register that might require special handling on the platform, a few more LIR operations are added to allocate the required resources for that particular parameter.

Pseudo Code For Improved Stub Generator

The following pseudo code describes an improved stub generator in accordance with an embodiment of the present invention. It makes use of the following types:

pd_addr is a C-storage type for platform dependent addresses.

64 bit long on the EM64T/AMD64 platform.

NativeFrame is a structure which is placed on the stack as part of the native call. It contains:

callAddr: the address of the native function to be called.

oldHandles: is a pointer to the old JNI handles.

realFrame: pointer to the real frame debugInfo: a pointer used for stack walking Variables:

--- mpi: ParamInfo structure used by the present invention to compile the MIR code.
params, nargs: The parameters to the function.
current_block, block_start, block_end, block_transit, block_return: Blocks
call, call_transit, ret, op, movlbl_native: Labels for MIR operations
thread_var: Points to the local data for the current thread.
ljf: Pointer to the last java frame on the stack.

Step (1) Add a variable that contains the pointer to the current thread. (Block 200):

```
block_start = CreateIRBlock(ir);
thread_var = IR_VARIABLE(ir, IR_PD_ADDR);
AppendIRToBlock(block_start, IR_THREAD_VM(ir, thread_var));
[Block 200:0]
```

Step (2) Create more blocks:

```
    current_block  = CreateIRBlock(ir);
    block_transit  = CreateIRBlock(ir);
    block_end      = CreateIRBlock(ir);
    ConnectIRBlock(ir, block_start, current_block);
```

Step (3) Add stack bang (Block 201):

```
AppendIRToBlock(current_block,
    IR_CALL_T(ir, IRFLAG_CALL_FIXED, IR_NOTYPE,
        cgGetCodeMethod(stackBang_V)))
[Block 201:1]
```

Step (4) Allocate space on the stack for the native frame:

```
CI_SET_NOOF_PARAMS_ON_STACK(irGetDebufInfo(ir),
    getNoofOnStackArgs(native_mpi));
nativeframe_pos = (FIRST_STACK_SLOT +
    getNoofOnStackArgs(native_mpi))* sizeof(void*);
handlestack_pos = nativeframe_pos + sizeof(struct NativeFrame);
```

Step (5) Calculate the pointer to the last Java frame, and fill it in. (Block 201):

```
ljf = IR_VARIABLE(ir, IR_PD_ADDR);
tmp = IR_VARIABLE(ir, IR_PD_ADDR);
[Block 201:2]
AppendIRToBlock(current_block, IR_ADD_T(ir, IR_PD_ADDR,
    sp,
    IR_CONSTANT(ir, IR_PD_ADDR, nativeframe_pos),
    ljf));
```

-continued

```
[Block 201:3]
AppendIRToBlock(current_block, IR_MOV_T(ir, IR_PD_ADDR,
        ljf,
        tmp));
```

Step (6) Store current stack pointer into the native frame on the stack. (Block 201):

```
AppendIRToBlock(current_block, STACK_STORE(ir,
    IR_PD_ADDR, sp,
        nativeframe_pos +
        offsetof(struct NativeFrame, realFrame)));
[Block 201:4]
```

Step (7) Store the pointer to the debugInfo structure for the native function in the native frame as well. (Block 201):

```
tmp = IR_VARIABLE(ir, IR_PD_ADDR);
AppendIRToBlock(current_block, IR_MOV_T(ir, IR_PD_ADDR,
                IR_CONSTANT(ir, IR_PD_ADDR,
    irGetDebugInfo(ir)),
                        tmp));
[Block 201:5]
AppendIRToBlock(current_block, STACK_STORE(ir, IR_PD_ADDR,
                tmp,
                nativeframe_pos + offsetof(struct
NativeFrame,
                debugInfo)));
[Block 201:6]
```

Step (8) Store a pointer to the previous JNI handles in the native frame. (Block 201):

```
tmp = IR_VARIABLE(ir, IR_PD_ADDR);
AppendIRToBlock(current_block, IR_LD_T(ir, IR_PD_ADDR, IR_PD_ADDR,
        thread_var, IR_CONSTANT(ir, IR_PD_ADDR,
    VMT_HANDLES_OFFSET), tmp));
[Block 201:7]
AppendIRToBlock(current_block, STACK_STORE(ir, IR_PD_ADDR,
        tmp,
        nativeframe_pos +
            offsetof(struct NativeFrame,
                oldHandles)));
[Block 201:8]
```

Step (9) Store the address of the native function in the native frame, this is used for stack walking. (Block 201):

```
tmp = IR_VARIABLE(ir, IR_PD_ADDR);
AppendIRToBlock(current_block,
        movlbl_native = IR_LIR_MOVLBL(ir, IR_NONE, tmp));
[Block 201:9]
AppendIRToBlock(current_block,
        STACK_STORE(ir, IR_PD_ADDR,
        tmp,
```

-continued

```
nativeframe_pos + offsetof(struct NativeFrame,
                          callAddr)));
[Block 201:10]
```

Step (10) Create the MIR operation for the call. Do not add it to any block yet:

```
irGetIRTypeAndSizeForJlcType(piGetReturnType(mpi), &type, &s);
call = IR_CALL_T(ir, IRFLAG_CALL_FIXED,
       IR_SIZE2VARTYPE(type), method);
irOpAddSourceVar(ir, call, IR_LABEL(ir, getCallPtr(code)));
```

Step (11) Set the call to be of the Java native type:
IRCallSetInfoTypes(ir, call, CALLINFO_JAVA2C, PARAMTYPE_NATIVE_JNI);

Step (12) The first parameter to the native function is the JNI environment. (Block 201):

```
param = IR_VARIABLE(ir, IR_PD_ADDR);
AppendIRToBlock(current_block, IR_ADD_T(ir, IR_PD_ADDR, thread_var,
                IR_CONSTANT(ir, IR_PD_ADDR,
                VMT_JNI_INTERFACE_OFFSET),
                param));
[Block 201:12]
IRAddSourceVar(ir, call, param);
```

Step (13) Add the parameters to the native function call. (Block 201,204,205,206):

```
for (pos=0 ; pos<nargs; pos++)
{
    from = params[pos];
    type = irVarGetType(ir, from);
        if (type == IR_REF)
        {
                    block_done = CreateIRBlock(ir);
                    append_nullcheck(ir, from, current_block, &block_null,
                            &block_non_null);
                    [Block 201:13]
                    ConnectIRBlock(ir, block_null, block_done);
                    ConnectIRBlock(ir, block_non_null, block_done);
                    hsp = push_reference(ir, block_non_null, call, from,
                                    &handlestack_pos, ¶m);
                    [Block 206:14,15]
                    AppendIRToBlock(block_null, IR_MOV_T(ir, IR_PD_ADDR,
                                    IR_0,
                                    param));
                    [Block 205:16,17]
                    current_block = block_done;
        }
        else
        {
                    param = IR_VARIABLE(ir, type);
                    if (type == IR_I32)
                    {
                        tmp = IR_VARIABLE(ir, type);
                        AppendIRToBlock(current_block, castOp =
                                SIGN_EXT_PARAMETER_TO_PLATFORM(ir, IR_PD_ADDR, from,
tmp));
                        [Block 204:18]
                        from = tmp;
                    }
                    AppendIRToBlock(current_block, IR_MOV_T(ir, type, from, param));
                    [Block 204:19]
        }
        irOpAddSourceVar(ir, call, param);
}
```

Step (14) Call the transit from Java function with the thread as an argument. (Block 204, 208):

```
AppendIRToBlock(current_block, op =
    IR_CALL_T(ir, IRFLAG_CALL_FIXED,
    IR_NOTYPE,
        cgGetCodeMethod(transitFromJava_pd_PV)));
irOpAddSourceVar(ir, op, thread_var);
[Block 204:20]
check_stack(ir, &current_block);
[Block 204:21,22 8:23]
```

Step (15) The NativeFrame is now a Java-compatible stack frame, store this in the thread local area for garbage collection purposes. (Block 207):

```
AppendIRToBlock(current_block, IR_ST_T(ir, IR_PD_ADDR, IR_PD_ADDR,
    thread_var,
    IR_CONSTANT(ir, IR_PD_ADDR, VMT_LAST_JAVA_FRAME_OFFSET),
    ljf));
[Block 207:24]
```

Step (16) Now add the call that was created earlier to the current block of code. (Block 207):
AppendIRToBlock(current_block, call);
[Block 207:11]

Step (17) After the call, restore the previous Java frame. If the previous Java frame was non-NULL it indicates that the process is returning to Java-code called from native JNI-code. Extra management is needed so transit2java is called. If an exception has occured in the native code, then transit2java will need to be called. Otherwise, the function can return quickly. (Block 207):

```
frame_var = IR_VARIABLE(ir, IR_PD_ADDR);
AppendIRToBlock(current_block, IR_LD_T(ir, IR_PD_ADDR, IR_PD_ADDR,
        thread_var,
        IR_CONSTANT(ir, IR_PD_ADDR,
VMT_CHECKATTRANSITFRAME_OFFSET),
        frame_var));
[Block 207:25]
AppendIRToBlock(current_block, IR_ST_T(ir, IR_PD_ADDR, IR_PD_ADDR,
    thread_var, IR_CONSTANT(ir, IR_PD_ADDR, VMT_LAST_JAVA_FRAME_OFFSET),
    frame_var));
[Block 207:26]
AppendIRToBlock(current_block, IR_CMP_T(ir, IR_PD_ADDR, frame_var, IR_0));
[Block 207:27]
irBBSetType(current_block, IRBB_JCC, IR_NE);
ConnectIRBlock(ir, current block, block_transit);
ConnectIRBlock(ir, current_block, block_end);
```

Step (18) Call transit2java if an exception has happened. As can be seen in this code the return object no longer needs to be explicitly preserved since the normal register allocation and spilling takes care of protecting it for us. (Block 202):

```
current_block = block_transit;
AppendIRToBlock(transit_block,
    call_transit = IR_CALL_T(ir, IRFLAG_CALL_FIXED,
    IR_NOTYPE,
```

-continued

```
        cgGetCodeMethod(transitToJava_PV)));
    irOpAddSourceVar(ir, call_transit, thread_var);
[Block 202:28]
ConnectIRBlock(ir, block_transit, block_end);
```

Step (19) Make useful sanity checks. These can be ignored when not debugging the JVM. (Block 203, 210):

```
check1 = IR_VARIABLE(ir, IR_PD_ADDR);
Check2 = IR_VARIABLE(ir, IR_PD_ADDR);
current_block = block_end;
```

-continued

```
irBBAppendOp(current_block,
    IR_LD_T(ir, IR_PD_ADDR, IR_PD_ADDR,
        thread_var,
        IR_CONSTANT(ir, IR_PD_ADDR,
VMT_LAST_JAVA_FRAME_OFFSET),
        check1));
[Block 203:29]
irBBAppendOp(current_block,
```

-continued

```
    IR_LD_T(ir, IR_PD_ADDR, IR_PD_ADDR,
        thread_var,
        IR_CONSTANT(ir, IR_PD_ADDR,
VMT_CHECKATTRANSITFRAME_OFFSET),
        check2));
[Block 203:30]
irBBAppendOp(current_block, IR_OR_T(ir, IR_PD_ADDR, check1,
    check2, check1));
[Block 203:31]
append nullcheck(ir, check1, block, &block_ok, &block_trap);
```

-continued

```
[Block 203:32]
irBBAppendOp(block_trap, IR_BREAK(ir));
[Block 210:33]
block_end = block_ok;
```

Step (20) Platform dependent transit2java part 2. This is a no-op on the x86_64/Linux platform. (Block 209):

```
current_block = block_end;
AppendIRToBlock(current_block, op = IR_CALL_T(ir,
IRFLAG_CALL_FIXED,
IR_NOTYPE,
        cgGetCodeMethod(transitToJava_pd_PV)));
irOpAddSourceVar(ir, op, thread_var);
[Block 209:34]
```

Step (21) Calculate the return IR operation "ret" from the native function. In this example the return value is void:

```
if (piGetReturnType(mpi) == JLC_VOID)
{
    ret = IR_RETURN0(ir);
}
else
{
    IRVAR res;
    irGetIRTypeAndSizeForJlcType(piGetReturnType(mpi), &flags, &s);
    type = IR_SIZE2VARTYPE(flags);
    res = IR_VARIABLE(ir, type);
    if (type == IR_REF) {
        IRBlockP block_null, block_non_null;
        IRBlockP block_done = CreateIRBlock(ir);
        IRVAR    res_native = IR_VARIABLE(ir,
        IR_PD_ADDR);
        irOpSetDestVar(call, res_native);
        append_nullcheck(ir, res_native, current_block,
            &block_null,
                &block_non_null);
        AppendIRToBlock(block_non_null, IR_LD_T(ir,
        IR_REF, IR_REF,
res_native,
            IR_0, res));
        AppendIRToBlock(block_null, IR_MOV_T(ir, IR_REF,
        IR_NULL, res));
        ConnectIRBlock(ir, block_non_null, block_done);
        ConnectIRBlock(ir, block_null, block_done);
        current_block = block_done;
    } else {
        set_flags(ir, type);
        irOpSetDestVar(call, res);
    }
    ret = IR_RETURN_T(ir, type, res);
}
```

Step (22) Restore the JNI handles. (Block 209):

```
tmp = IR_VARIABLE(ir, IR_PD_ADDR);
AppendIRToBlock(current_block, STACK_LOAD (ir, IR_PD_ADDR,
    nativeframe_pos + offsetof(struct NativeFrame,
        oldHandles),
    tmp));
[Block 209:36]
AppendIRToBlock(current_block, IR_ST_T(ir, IR_PD_ADDR, IR_PD_ADDR,
    thread_var,
    IR_CONSTANT(ir, IR_PD_ADDR, VMT_HANDLES_OFFSET),
    tmp));
[Block 209:37]
```

Step (23) Now create the return code block. (Block 211):

```
block_return = CreateIRBlock(ir);
AppendIRToBlock(block_return, ret);
[Block 211:35]
ConnectIRBlock(ir, current_block, block_return);
```

Step (24) Now that the call IR operation exists the label can be inserted into the previous storage operation:

Listing 9

```
irOpSetSourceVar(movlbl_native, 0, irOpGetOrCreateLabel(ir, call));
Entering code with object pointer in rsi and integer argument in eax.
0x2aaaee0e82d0:     push      %rbx
0x2aaaee0e82d1:     push      %rbp
0x2aaaee0e82d2:     sub       $0x38,%rsp
Save object pointer into r11.
0x2aaaee0e82d6:     mov       %rsi,%r11
Save integer argument into esi
0x2aaaee0e82d9:     mov       %eax,%esi
[Block 200]
0x2aaaee0e82db:     mov       %fs:0xd8,%r13
[Block 201]
0x2aaaee0e82e4:     movq      $0x0,0xfffffffffffff000(%rsp)
0x2aaaee0e82f0:     mov       %rsp,%r15
0x2aaaee0e82f3:     add       $0x8,%r15
0x2aaaee0e82f7:     mov       %r15,%r14
0x2aaaee0e82fa:     mov       %rsp,0x20(%rsp)
0x2aaaee0e82ff:     mov       $0x6dff10,%r15
0x2aaaee0e8309:     mov       %r15,0x8(%rsp)
0x2aaaee0e830e:     mov       0x230(%r13),%r8
0x2aaaee0e8315:     mov       %r8,0x18(%rsp)
0x2aaaee0e831a:     mov       $0x2aaaee0e8371,%rax
0x2aaaee0e8324:     mov       %rax,0x10(%rsp)
0x2aaaee0e8329:     lea       0x228(%r13),%r15
0x2aaaee0e8330:     test      %r11,%r11
0x2aaaee0e8333:     jne       0x2aaaee0e833f
[Block 205]
0x2aaaee0e8335:     xor       %rdi,%rdi
0x2aaaee0e8338:     mov       %rdi,0x28(%rsp)
0x2aaaee0e833d:     jmp       0x2aaaee0e834b
[Block 206]
0x2aaaee0e833f:     mov       %r11,0x28(%rsp)
0x2aaaee0e8344:     mov       %rsp,%rdi
0x2aaaee0e8347:     add       $0x28,%rdi
[Block 204]
0x2aaaee0e834b:     mov       %r13,0x30(%rsp)
Move the integer argument from esi to rdx.
0x2aaaee0e8350:     movslq    %esi,%rdx
0x2aaaee0e8353:     mov       %rsp,%r13
0x2aaaee0e8356:     and       $0xf,%r13
0x2aaaee0e835a:     test      %r13,%r13
0x2aaaee0e835d:     jne       0x2aaaee0e83c2
[Block 207]
0x2aaaee0e835f:     mov       0x30(%rsp),%rsi
0x2aaaee0e8364:     mov       %r14,0x8(%rsi)
Move calculated JNIEnv pointer into rsi.
```

-continued

Listing 9

```
0x2aaaee0e8368:     mov     %rdi,%rsi
Move object pointer into rdi.
0x2aaaee0e836b:     mov     %r15,%rdi
0x2aaaee0e836e:     mov     %rsp,%r12
0x2aaaee0e8371:     callq   0x2aab2e4296d8
                            <Java_HelloWorld_printHelloWorld>
0x2aaaee0e8376:     mov     %r12,%rsp
0x2aaaee0e8379:     mov     0x30(%rsp),%r10
0x2aaaee0e837e:     mov     0x10(%r10),%rcx
0x2aaaee0e8382:     mov     %rcx,0x8(%r10)
0x2aaaee0e8386:     test    %rcx,%rcx
0x2aaaee0e8389:     je      0x2aaaee0e839a
[Block 202]
0x2aaaee0e838b:     mov     0x30(%rsp),%rbx
0x2aaaee0e8390:     mov     %rbx,%rax
0x2aaaee0e8393:     callq   0x2aaaee0a2010
0x2aaaee0e8398:     jmp     0x2aaaee0e839f
[Block 203]
0x2aaaee0e839a:     mov     0x30(%rsp),%rbx
0x2aaaee0e839f:     mov     0x8(%rbx),%r9
0x2aaaee0e83a3:     mov     0x10(%rbx),%rdi
0x2aaaee0e83a7:     or      %rdi,%r9
0x2aaaee0e83aa:     test    %r9,%r9
0x2aaaee0e83ad:     jne     0x2aaaee0e83c3
[Block 209]
0x2aaaee0e83af:     mov     0x18(%rsp),%r12
0x2aaaee0e83b4:     mov     %r12,0x230(%rbx)
[Block 211]
0x2aaaee0e83bb:     add     $0x38,%rsp
0x2aaaee0e83bf:     pop     %rbp
0x2aaaee0e83c0:     pop     %rbx
0x2aaaee0e83c1:     retq
[Block 208]
0x2aaaee0e83c2:     DEBUG trap
[Block 210]
0x2aaaee0e83c3:     DEBUG trap
```

Listing 9 shows the final native machine code for the stub. In accordance with embodiments of the present invention, the virtual machine has enabled automatic generation of this stub. The stub translates the Java calling convention with the object pointer in rsi and the integer argument in eax to the native calling convention with a JNIEnv pointer in rsi, the object pointer in rdi and the integer argument in rdx. The calling convention adaptor creates the MIR code for this stub, not using platform specific knowledge. The compiler then compiles the MIR code using the ParamInfo which contained the platform specific knowledge. Since embodiments of the present invention extend the compiler to generate stubs (with the calling convention adaptor and the ParamInfo structure), there is no separate manual work required to maintain the stub generation code. If the compiler can compile for the platform, it can generate native call stubs for the platform. Furthermore, since the compiler has access to a higher level description of the native call stub it can apply advanced compiler optimization techniques on the stub to increase the code efficiency. It is even possible to include the MIR of the native call into the MIR of the caller to achive even higher performance improvements. There is no limitation on what kind of native calls can be generated. JNI-compatible calls such as 117 in FIG. 1 can co-exist with raw calls such as 119 in FIG. 1 within the same JVM. Therefore embodiments of the present invention improve native call performance, and reduce the manual work needed to add new calling conventions when the number of CPU/OS combinations grow.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while the examples described herein illustrate how the features may be used in a WebLogic or JRockit environment, other application servers, virtual machines, JVMs, computing environments, and software development systems may use and benefit from the invention. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for generating native code calls from byte code in virtual machines, comprising:
   a computer running an operating system with native libraries;
   a virtual machine for executing a software application;
   a memory space for a compiled byte code as part of the software application;
   a compiler with a parameter data structure and a calling convention adaptor;
   wherein the parameter data structure contains platform specific information; and wherein the calling convention adaptor integrates native calls into a high level analysis step of the compilation of byte codes and generates medium level intermediate representation (MIR) code for the native calls.

2. The system of claim 1, wherein the compiler uses the parameter data structure to compile a MIR call into a low level intermediate representation (LIR) by looking up the proper storage for each MIR call parameter in the parameter data structure and adding move operations for each MIR call parameter.

3. The system of claim 1, wherein the MIR of the native call is inserted into the MIR of the caller code.

4. The system of claim 1, wherein the MIR for Java to Java calls are compiled using the parameter data structure.

5. The system of claim 4, wherein several different native calling conventions are used simultaneously.

6. A method for generating native code calls from byte code in virtual machines, comprising the steps of:
- running an operating system with native libraries on a computer;
- executing a software application by a virtual machine;
- storing a compiled byte code as part of the software application in a memory space;
- integrating native calls into a high level analysis step of the compilation of byte codes by a compiler with a parameter data structure and a calling convention adaptor;
- wherein the parameter data structure contains platform specific information; and wherein the calling convention adaptor generates medium level intermediate representation (MIR) code for the native calls.

7. The method of claim 6, wherein the compiler uses the parameter data structure to compile a MIR call into a low level intermediate representation (LIR) call by looking up the proper storage for each MIR call parameter in the parameter data structure and adding move operations for each MIR call parameter.

8. The method of claim 6, wherein the MIR of the native call is inserted into the MIR of the caller code.

9. The method of claim 6, wherein the MIR for Java to Java calls are compiled using the parameter data structure.

10. The method of claim 9, wherein several different native calling conventions are used simultaneously.

11. The system of claim 2 wherein the parameter data structure comprises:
- a call type of the MIR call;
- a plurality of arguments;
- a plurality of platform words that are pushed on a stack to store the plurality of arguments;
- a plurality of MIR memory storage locations for the arguments including registers and stack positions;
- type for the each MIR call parameter and type for a return value; and
- MIR memory storage locations for each MIR call parameter and MIR memory storage location for a return type.

12. The method of claim 7 wherein the parameter data structure comprises:
- a call type of the MIR call;
- a plurality of arguments;
- a plurality of platform words that are pushed on a stack to store the plurality of arguments;
- a plurality of MIR memory storage locations for the arguments including registers and stack positions;
- type for the each MIR call parameter and type for a return value; and
- MIR memory storage locations for each MIR call parameter and MIR memory storage location for a return type.

* * * * *

UNITED STATES PATENT AND TRADEMARK OFFICE
CERTIFICATE OF CORRECTION

PATENT NO. : 7,353,504 B2  Page 1 of 1
APPLICATION NO. : 11/397212
DATED : April 1, 2008
INVENTOR(S) : Lagergren It is certified that error appears in the above-identified patent and that said Letters Patent is hereby corrected as shown below:

In column 1, line 62, before "virtual" delete "the".

In column 2, line 52, delete "Programmers" and insert -- Programmer's --, therefor.

In column 3, line 37, delete "( );" and insert -- (); --, therefor.

In column 4, line 14, delete "bytcode" and insert -- byte code --, therefor.

In column 4, line 21, delete "bytecode" and insert -- byte code --, therefor.

In column 6, line 44, after "generated" insert -- stub. --.

In column 7, line 33, delete "[ ]" and insert -- ☐ --, therefor.

In column 7, line 34, delete "[ ]" and insert -- ☐ --, therefor.

In column 10, line 11, delete "align;" and insert -- align); --, therefor.

In column 24, line 50, delete "[ ]" and insert -- ☐ --, therefor.

In column 24, line 52, delete "[ ] = (X86" and insert -- ☐ = {X86 --, therefor.

In column 26, line 45, delete "pd addr" and insert -- pd_addr --, therefor.

In column 32, line 13, delete "Check2" and insert -- check2 --, therefor.

In column 35, line 57, delete "achive" and insert -- achieve --, therefor.

Signed and Sealed this

Ninth Day of February, 2010

David J. Kappos
*Director of the United States Patent and Trademark Office*